US012522737B2

(12) United States Patent
Morelli et al.

(10) Patent No.: US 12,522,737 B2
(45) Date of Patent: Jan. 13, 2026

(54) CROSSLINKABLE FLAME-RETARDANT COATING COMPOSITION

(71) Applicant: SWIMC LLC, Cleveland, OH (US)

(72) Inventors: Elio Morelli, Bologna (IT); Maurizio Fiorini, San Possidorio (IT); Gang Duan, Hinckley, OH (US); Giampaolo Zilli, San Lazzaro di Savena (IT); Marc Augusto Ghini, Bologna (IT)

(73) Assignee: SWIMC LLC, Cleveland, OH (US)

( * ) Notice: Subject to any disclaimer, the term of this patent is extended or adjusted under 35 U.S.C. 154(b) by 845 days.

(21) Appl. No.: 17/624,655

(22) PCT Filed: Jul. 13, 2020

(86) PCT No.: PCT/US2020/041797
§ 371 (c)(1),
(2) Date: Jan. 4, 2022

(87) PCT Pub. No.: WO2021/011467
PCT Pub. Date: Jan. 21, 2021

(65) Prior Publication Data
US 2022/0275218 A1 Sep. 1, 2022

(30) Foreign Application Priority Data
Jul. 17, 2019 (IT) .......................... 102019000012156

(51) Int. Cl.
| | |
|---|---|
| *B05D 7/06* | (2006.01) |
| *B05D 7/00* | (2006.01) |
| *C08G 71/02* | (2006.01) |
| *C08K 3/32* | (2006.01) |
| *C08K 5/053* | (2006.01) |
| *C08K 5/07* | (2006.01) |
| *C08K 5/29* | (2006.01) |
| *C08L 101/00* | (2006.01) |
| *C09D 5/18* | (2006.01) |

(52) U.S. Cl.
CPC .............. *C09D 5/18* (2013.01); *B05D 7/06* (2013.01); *B05D 7/536* (2013.01); *C08G 71/02* (2013.01); *C08K 3/32* (2013.01); *C08K 5/053* (2013.01); *C08K 5/07* (2013.01); *C08K 5/29* (2013.01); *C08L 101/005* (2013.01); *B05D 2203/20* (2013.01); *B05D 2425/02* (2013.01); *C08K 2003/323* (2013.01); *C08K 2201/019* (2013.01)

(58) Field of Classification Search
CPC ....... C08L 101/005; C08K 5/053; C09D 5/18; H01B 7/295
See application file for complete search history.

(56) References Cited

U.S. PATENT DOCUMENTS

| | | |
|---|---|---|
| 4,010,137 A | 3/1977 | Brady |
| 4,254,177 A * | 3/1981 | Fulmer .................... B32B 5/20 |
| | | 428/256 |
| 4,507,466 A | 3/1985 | Tomalia et al. |
| 4,568,737 A | 2/1986 | Tomalia et al. |
| 4,587,329 A | 5/1986 | Tomalia et al. |
| 4,694,064 A | 9/1987 | Tomalia et al. |
| 4,713,975 A | 12/1987 | Tomalia et al. |
| 4,737,550 A | 4/1988 | Tomalia |
| 4,857,599 A | 8/1989 | Tomalia et al. |
| 4,871,779 A | 10/1989 | Killat et al. |
| 4,977,219 A | 12/1990 | Watson |
| 5,418,301 A | 5/1995 | Hult et al. |
| 5,574,083 A | 11/1996 | Brown et al. |
| 6,794,039 B2 | 9/2004 | Huusken |
| 8,293,823 B2 | 10/2012 | Engelmann et al. |
| 2002/0119320 A1 | 8/2002 | Ramesh et al. |
| 2002/0136901 A1 | 9/2002 | Ramesh et al. |
| 2010/0152376 A1 | 6/2010 | Wermter |
| 2010/0197867 A1 | 8/2010 | Niimi et al. |
| 2015/0118430 A1 * | 4/2015 | Korzhenko .............. C08K 3/04 |
| 2016/0145466 A1 | 5/2016 | Spilman |
| 2018/0016377 A1 * | 1/2018 | Kumar ................... C08G 18/62 |

(Continued)

FOREIGN PATENT DOCUMENTS

| | | |
|---|---|---|
| CN | 102850881 | 1/2013 |
| CN | 103897313 A | 7/2014 |

(Continued)

OTHER PUBLICATIONS

CN108314773A English (Year: 2018).*
Extended European Search Report from European Patent Application No. EP 20840204.0 dated Sep. 18, 2023.
Office Action dated Oct. 8, 2022 for Chinese Patent Application No. 202080045943.X, 15 pages (including English translation).
Written Opinion & International Search Report dated Sep. 17, 2020 for International PCT Application No. PCT/US2020/041797, 13 pages.

(Continued)

*Primary Examiner* — Catherine S Branch
*Assistant Examiner* — Huihong Qiao
(74) *Attorney, Agent, or Firm* — Tucker Ellis LLP

(57) ABSTRACT

The invention is directed to a crosslinkable flame-retardant coating composition comprising the following components:
a) a dendritic polymer having hydroxyl groups, wherein the dendritic polymer has a hydroxyl number in the range of 80 to 800,
b) a polyol having at least 3 hydroxyl groups,
c) an ammonium polyphosphate compound,
d) a base coat polymer selected from a polycarbamate resin or a polymer bearing carboxyl groups, and
e) a crosslinker for crosslinking the base coat polymer selected from a compound having two or more aldehyde groups, acetals or hemiacetals of the aldehydes, or a polycarbodiimide.

Such a cross-linkable flame-retardant coating composition improves the overall appearance of the cross-linked base coating on a substrate and also imparts improved flame-retardancy.

20 Claims, No Drawings

(56) References Cited

U.S. PATENT DOCUMENTS

| | | | | |
|---|---|---|---|---|
| 2018/0312722 A1* | 11/2018 | Xu | .................... | C09D 175/12 |
| 2019/0062571 A1* | 2/2019 | Lottenbach | .............. | C09D 5/18 |
| 2019/0105884 A1* | 4/2019 | Kelly-Rowley | ........ | B32B 27/32 |

FOREIGN PATENT DOCUMENTS

| | | | | |
|---|---|---|---|---|
| CN | 106750248 | | 5/2017 | |
| CN | 108314773 A | * | 7/2018 | ............ C08G 18/81 |
| CN | 106750248 B | | 1/2019 | |
| CN | 109280351 A | | 1/2019 | |
| CN | 109627943 A | | 4/2019 | |
| EP | 0277361 | | 8/1988 | |
| EP | 1167463 | | 1/2002 | |
| EP | 1167463 A1 | | 1/2002 | |
| EP | 1799770 | | 6/2007 | |
| EP | 3049464 | | 8/2016 | |
| EP | 3710537 | | 9/2020 | |
| EP | 3910034 | | 11/2021 | |
| EP | 3910035 | | 11/2021 | |
| EP | 3913034 | | 11/2021 | |
| WO | 0068337 | | 11/2000 | |
| WO | 2004055029 | | 7/2004 | |
| WO | 2016173743 | | 11/2016 | |

OTHER PUBLICATIONS

Office Action dated Mar. 30, 2022 for Vietnamese Patent Application No. 1-2022-00115, 2 pages (including English translation).

Office Action dated Mar. 4, 2020 for Italian Patent Application No. 102019000012156, 11 pages (including English Translation of substantive portion).

* cited by examiner

CROSSLINKABLE FLAME-RETARDANT COATING COMPOSITION

Flame retardant coating compositions for substrates are continuously improved in order to reduce the contribution of the substrate to fire and in order to satisfy increasingly stricter norms. These substrates include for example steel, glass, concrete, polymers or wood. Flame retardant compositions often exert their effect on the coated substrate via a complex interaction between the components of the coating composition.

The PCT patent application WO 2016/173743 A1 describes a method for improving the fire retardant properties of an item of wood comprising measuring the moisture content of the wood and drying the wood if it has a moisture content greater than 20% to result in a moisture content no greater than 20% and coating the item with a first coating formulation comprising an aqueous solution containing boric acid, an amine or ammonium salt and phosphate. Finally, a film-forming polymer material in an aqueous carrier is applied on the surface of the item already covered with the first coating formulation. Such a coating procedure is supposed to treat wood in such a way that it can among others meet the class B fire retardancy standard according to various norms, such as EN 13823:2010 or EN 13501-1. The procedure described in WO 2016/173743 A1 is very complicated and requires determination of the moisture content of the substrate as well as the application of different coatings to the substrate.

It is an object of the present invention to provide a cross-linkable flame-retardant coating composition which can easily be applied to the substrate and which reliably improves the fire retardancy of the substrate. The coating composition shall further have good clarity when applied as a clear coat.

This objective is met by a cross-linkable flame-retardant coating composition according to claim 1. Subject-matter of further independent claims is a flame-retardant coating comprising the cross-linked composition and a process for producing a flame-retardant coating on a substrate employing the cross-linkable flame-retardant composition.

The present invention relates to a cross-linkable flame-retardant coating composition comprising the following components:
a) a dendritic polymer having hydroxyl groups, wherein the dendritic polymer has a hydroxyl number in the range of 80 to 800,
b) a polyol having at least 3 hydroxyl groups,
c) an ammonium polyphosphate compound,
d) a base coat polymer selected from a polycarbamate resin or a polymer bearing carboxyl groups, and
e) a cross-linker for cross-linking the base coat polymer selected from a compound having two or more aldehyde groups, acetals or hemiacetals of the aldehydes, or a polycarbodiimide.

The cross-linkable flame-retardant coating composition confers flame retardancy via a thermally insulating carbonaceous char on the substrate, which is formed in the event of a fire. The carbonaceous char expands to a volume many times the thickness of the coating and protects the underlying substrate from the fire. In particular, the expansion factor can be in the range between 10 and 20. For example, a 300 µm thick flame-retardant coating can expand to a thickness of 3 to 4 mm in the case of a fire. These flame-retardant coatings which form the expanding carbonaceous char are also called "intumescent" coatings (Latin: intumescencia=swelling). Without being bound by any theory, it is believed that the carbonaceous char is formed via a complex reaction between the ammonium polyphosphate compound, component c) releasing phosphoric acid and component b), the polyol having at least 3 hydroxyl groups, which serves as a carbon source for the char.

Component a), the dendritic polymer having hydroxyl groups, positively interacts with components b) and c) to provide an improved flame retardancy in the event of a fire and furthermore positively influences the appearance of the cross-linked coating on the substrate after curing (clear appearance, no whitening). This effect is particularly distinct when the dendritic polymer has a hydroxyl number in the range of 80 to 800. The hydroxyl number can be determined via acetic anhydride acetylation according to the test method ASTM E222-17.

The cross-linkable flame-retardant coating composition of the invention can easily be applied to a substrate and does not have to be applied in separate coating procedures, thereby greatly simplifying method of imparting flame-retardancy to a substrate.

Furthermore, due to the presence of the components a) to e), the cross-linkable flame-retardant coating composition of the invention is able to impart classification B (very limited contribution to fire) according to the European standard EN 13501 to coated substrates. This is particularly valuable for flammable substrates, such as substrates comprising cellulose, in particular wooden substrates which would highly contribute to the spread of the fire if not coated with the coating composition of the present invention. The present invention is therefore particularly well suited for coating of furniture.

The combination of the base coat polymer and the cross-linker for cross-linking the base coat polymer is selected in such a way that the formation of the cross-linked basecoat does not consume compounds including hydroxyl groups, which are required for the intumescent effect. In one embodiment of the cross-linkable flame-retardant coating composition of the invention, the polycarbamate reacts with the cross-linker being the compound having 2 or more aldehyde groups. In a second embodiment, cross-linking can be done by reacting the basecoat polymer bearing carboxyl groups with the cross-linker being the polycarbodiimide.

Many conventional polyurethane coating compositions are formed by reacting polyisocyanates as base polymers with polyols as cross-linkers. In this case, the polyisocyanates can inadvertently react with other polyol components which are responsible for the intumescent effect during the cross-linking. These unwanted cross-linking reactions can negatively impact the flame-retardant effect of the coating in the case of fire and are avoided when using the cross-linkable flame-retardant coating composition of the present invention which is isocyanate-free.

According to one embodiment, the cross-linkable flame-retardant coating composition of the invention forms an isocyanate-free polyurethane coating, wherein component d) comprises the polycarbamate resin and component e) comprises the compound having 2 or more aldehyde groups as a cross-linker, wherein the composition further comprises a component f), an acid catalyst. In this case, the polycarbamate resin is cross-linked by the compound having 2 or more aldehyde groups resulting in a polyurethane basecoat. This cross-linking reaction does not require compounds with hydroxyl groups, so that the polyols of the cross-linkable coating composition are still present in the polyurethane composition after cross-linking and therefore can participate in the intumescent effect in the event of a fire. Preferably, such a system is a 2K isocyanate-free polyurethane system.

In particular, the polycarbamate of the present invention can have the following general structure I:

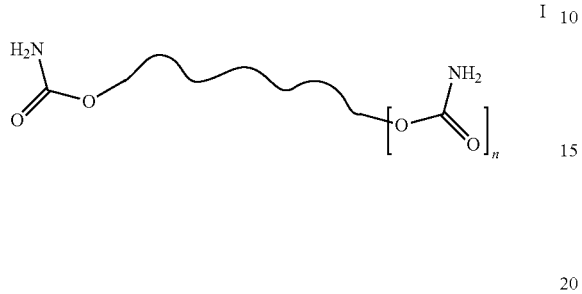

wherein the curved line indicates the backbone of the polycarbamate and wherein the parameter n is a natural, integral number between 1 to 50, preferably 1 to 20, most preferably 1 to 4.

The polycarbamate can have an average of 2 or more carbamate groups, such as an average of 2.5, 3 or 4 or more carbamate groups. The term "average number of carbamate groups" refers to the total number average molecular weight of the polycarbamate as determined by gel permeation chromatography divided by the number of hydroxyl groups in the polyol used to make the polycarbamate or the number of isocyanate groups in the polyisocyanate used to make the carbamate, whichever is used. In particular, the polycarbamate can be an acrylic, styrene-acrylic, styrene-butadiene, saturated polyester, urethane, alkyd, polyether or polycarbamate polymer.

The polycarbamate can be an isocyanate-free acrylic carbamate polymer marketed by Dow under the trademarks PARALOID® EDGE 2121 or PARALOID EDGE 1311 HP. Further isocyanate-free acrylic carbamate polymers marketed by Dow are PARALOID EDGE 1315 for wood, PARALOID EDGE 2595 for metal and for primers PARALOID EDGE 1100.

The compound having 2 or more aldehyde groups, acetals or hemiacetals of the aldehydes can in particular have 3 or more, or even 4 or more aldehyde groups. The compound having 2 or more aldehyde groups can comprise from 2 to 20 carbon atoms and can also comprise more than 20 carbon atoms for example up to 100 carbon atoms, with the proviso that the compound having 2 or more aldehyde groups and having more than 20 carbon atoms has at least one aldehyde group for every 10 carbon atoms. The 2 or more aldehyde groups harboring compound can be acyclic, cyclic, non-aromatic or aromatic. Examples of cyclic compounds with 2 or more aldehyde groups are cis-1,3-cyclohexanedicarboxaldehyde, trans-1,4-cyclohexanedicarboxaldehyde, exo,exo-2,5-norbornanedicarboxaldehyde, 3-(3-formylcyclohexyl)propanal, 3-(4-formylcyclohexyl)-propanal; 2-(3-formylcyclohexyl)propanal, 2-(4-formylcyclohexyl)propanal, exo,exo-2,6-norbornanedicarboxaldehyde, or mixtures of the mentioned aldehydes.

The compound having 2 or more aldehyde groups can for example be a mixture of cis-1,3-cyclohexanedicarboxaldehyde and trans-1,4-cyclohexanedicarboxaldehyde, which is marketed by Dow under the trademark PARALOID® EDGE XL-195.

The compound having 2 or more aldehyde groups can preferably be selected from following compounds with the formulas II or III:

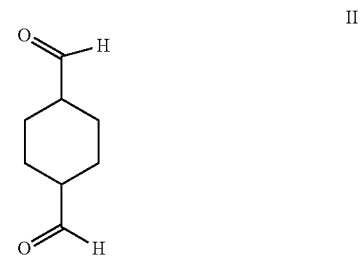

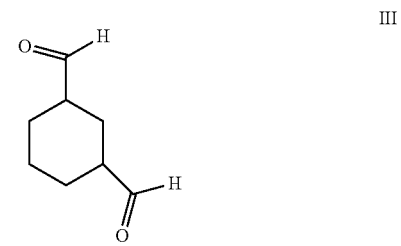

The acid catalyst f) is required in order to cross-link the polycarbamate and the compound containing at least 2 aldehyde groups within a relatively short period of time, for example hours or one day, preferably at room temperature. The acid catalyst preferably can have a pKa of less than 6 at 25° C., preferably less than 4, more preferably less than 3, wherein the pKa is the negative base-10 logarithm of the acid dissociation constant Ka of the acid catalyst. The acid catalyst can either be a protic acid (Broensted acid) or a Lewis acid. Examples of protic acids are either inorganic or organic protic acids, such as phosphoric acid, sulfuric acid, carboxylic acid, phosphonic acid or sulfonic acid, with p-toluene sulfonic acid being a preferred acid. Examples of Lewis acids are $AlCl_3$, $TiCl_4$, $SnCl_4$, $CrCl_2$, $NiCl_2$, $FeCl_3$ or benzyltriethylammonium chloride.

The cross-linking reaction between the polycarbamate and the compound containing at least 2 aldehyde groups, catalyzed by the acid, can produce polyurethanes as shown below (for reasons of simplicity, only one crosslinked group is shown below for each polycarbamate molecule in the crosslinked polyurethane below):

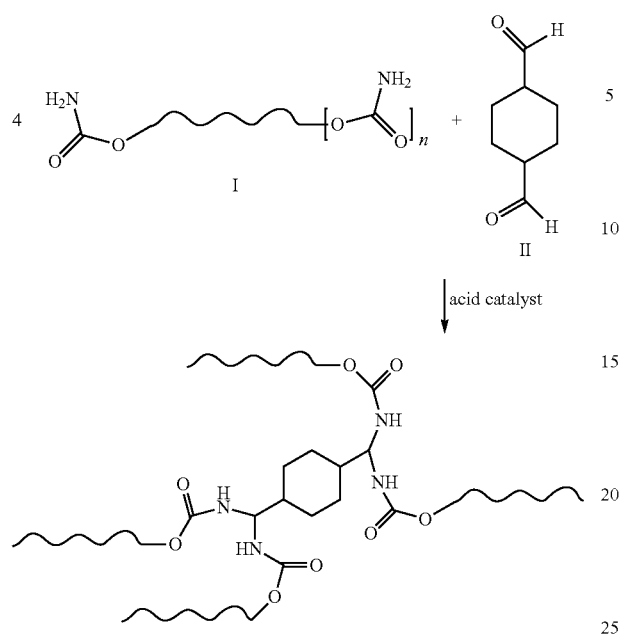

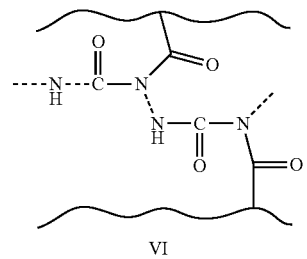

VI

Further details of the polycarbamates, the compounds having 2 or more aldehyde groups and the acid catalyst as component f) used in the present invention and methods for producing them, are disclosed in US 2018/0312722 A1, which is hereby incorporated in its entirety.

In a further embodiment, the cross-linkable flame-retardant composition can form a poly-N-acylurea coating, wherein component d) comprises a polymer having 2 or more carboxylic acid groups as a basecoat polymer and component e) comprises a polycarbodiimide as a cross-linker.

Similarly to the above described polyurethane, the poly-N-acylurea can be formed without consuming the polyols being present in the coating composition. The cross-linking reaction between the polycarbodiimide with the formula IV and the polymer with the formula V containing the carboxylic acid groups resulting in the poly-N-acylurea of formula VI is shown below. For reasons of simplicity, the backbones of both the polycarbodiimide as well as the polymer containing the carboxylic acid groups are shown as curved or dashed lines:

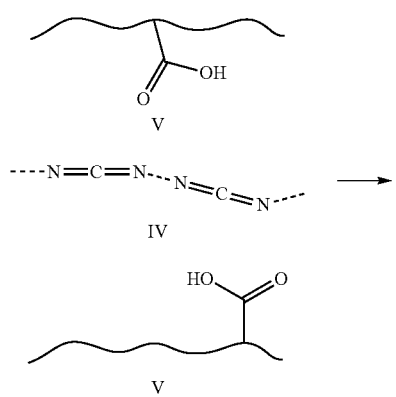

The polymers containing the carboxylic acid groups can for example be polyurethanes, polyacrylates or latex containing carboxylic acid groups. The polycarbodiimide can be any known carbodiimide, for example aromatic polycarbodiimides as disclosed in U.S. Pat. No. 5,574,083, which is incorporated in its entirety. Other aliphatic polycarbodiimides are for example described in U.S. Pat. No. 4,977,219 and EP 0 277 361, which are also incorporated in their entireties. The cross-linking employing the polycarbodiimides can be carried out by bringing the polycarbodiimides in contact with the polymers containing the carboxylic acid groups, for example via mixing, preferably in the presence of a catalyst. The polycarbodiimide mediated cross-linking also enhances the film strength, the water resistance and the abrasion properties of the cross-linked poly-N-acylurea coatings.

The advantage of forming either an isocyanate-free polyurethane coating or a poly-N-acylurea coating is that both systems provide a film with high thermal plasticity which does not impair the formation of the carbonaceous char when exposed to fire.

In accordance with the present invention, the coating composition comprises a dendritic polymer as component a). The dendritic polymer having hydroxyl groups can for example be manufactured by the stepwise addition of monomers so that with every linking step the number of the reactive monomer groups grows exponentially, resulting in a spherical dendritic molecule with a tree-like backbone structure. The dendritic polymer can be based on polyesters, polyethers, polythioethers, polyamides, polyether amides, polyacrylates, polyalkylenes or other polymers. The core of the dendritic polymer having hydroxyl groups can be built by a polyalcohol, such as trimethylolpropane, pentaerythritol or other derivatives thereof. The dendritic molecules having hydroxyl groups as component a) can for example be dendritic polymers sold under the trademark BOLTORN® by Perstorp Holding AB. The dendritic polymers having hydroxyl groups can for example be synthesized by polycondensation of bis(methylol)propionic acid in the presence of trimethylolpropane.

Particularly useful dendritic polymers having hydroxyl groups are BOLTORN® P1000 or BOLTORN® P500 having the following chemical structures:

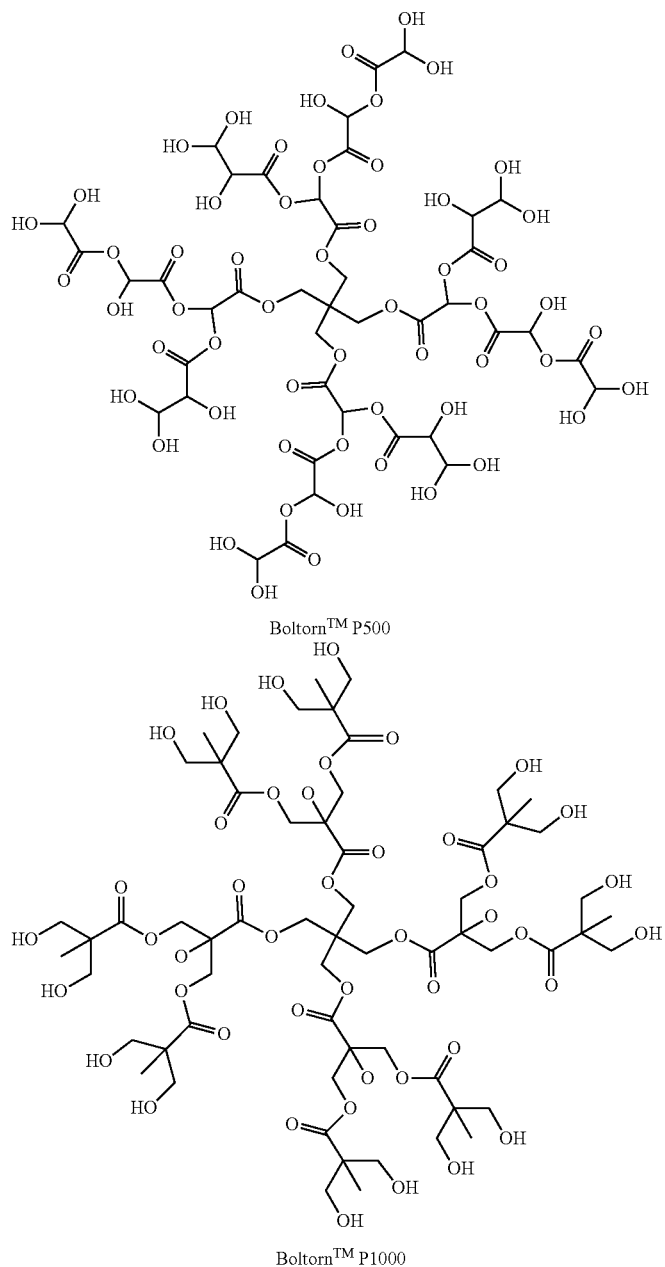

Boltorn™ P500

Boltorn™ P1000

The dendritic polymer having hydroxyl groups assists in the intumescent effect and also can have a positive effect on the appearance of the cured, cross-linked coating on the substrate. In particular, it is believed that the dendritic polymer assists in wetting the polyol having at least 3 hydroxyl groups in the flame-retardant coating composition, thereby improving the appearance of the coating and reducing for example the number of whitish pores.

Preferably, component a) has a hydroxyl value of between 100 to 700, preferably 120 to 600, most preferably 460 to 480. The dendritic polymer having these hydroxyl values imparts a particular advantageous effect with regard to flame-retardancy and appearance of the cross-linked coat.

According to a preferred embodiment, the cross-linkable flame-retardant coating composition of the present invention is a clear coating composition. Such clear coating lacks any pigments and/or colorants, and is free of melamine, a white compound which is often used as the nitrogen donor for the intumescent effect in flame-retardant compositions. Such a variant of the cross-linkable flame-retardant coating composition of the invention is particularly useful in order to view the structure of the underlying substrate after coating. For example, if wood is used as a substrate, its texture can still be viewed underneath the cross-linked coating. In this embodiment of the present invention, component a), the dendritic polymer having hydroxyl groups also improves the overall appearance of the clear coat after cross-linking and can for example reduce the appearance of whitish pores in the clearcoat (see the experimental section). The present invention is particularly suitable as a high quality clear coating for furniture providing excellent flame-retardancy.

According to another embodiment, the cross-linkable flame-retardant coating composition of the invention contains pigments and/or colorants. These pigments and/or colorants can confer a certain desirable color impression to a substrate which is coated with the coating composition of the present invention.

Component b), the polyol having at least 3 hydroxyl groups, can preferably have at least 5 hydroxyl groups and is preferably selected from the group consisting of pentaerythritol, dipentaerythritol, and tripentaerythritol. These polyols provide the carbon for the formation of the char during the intumescent effect.

In a further embodiment of the cross-linkable flame-retardant coating composition of the invention, component e), the cross-linker is preferably selected from a group consisting of cis-1,3-cyclohexanedicarboxaldehyd and trans-1,4-cyclohexanedicarboxaldehyd. These cross-linkers are particularly useful in cross-linking polyurethanes.

The cross-linkable flame-retardant coating composition can furthermore comprise at least one solvent as component g), which is preferably selected from alcohols, acetates and/or ketones. The alcohols are preferably selected from C1 to C4 alcohols, in particular ethanol. The ketones are preferably selected from C1 to C4 ketones, for example methyl ethyl ketone, methyl isobutyl ketone (MIBK), methyl isoamyl ketone (MIAK) and/or methyl N-amyl ketone (MAK). The acetates, esters of acetic acid are also preferably selected from C1 to C4 acetates, for example butyl acetate.

The cross-linkable flame-retardant coating composition can additionally comprise further flame-retardant additives, such as a fluorinated polymer as component h). The fluorinated polymer can improve and stabilize the formation of the char during the intumescent effect.

The cross-linkable flame-retarding coating composition can additionally comprise silicates as component i). These components are particularly suited in order to improve the strength of the char during the intumescent effect. Typical examples of component i) are silicates, which are modified with quaternary ammonium compounds of di-$C_{16}$-$C_{18}$-alkyldimethyl, chlorides and quartz. The modified silicates can in particular, be modified montmorillonite (($Na,Ca)_{0.3}$$(Al,Mg)_2Si_4O_{10}(OH)_2.nH_2O$) and/or modified sepiolite ($Si_{12}O_{30}Mg_8(OH)_4(OH_2)_4.8H_2O$).

Furthermore, the cross-linkable flame-retardant coating composition can additionally comprise haloalkyl-phosphates as component j) which can further decrease the amount of early flame spread and assist in wetting the components of the cross-linkable flame-retardant coating composition. Examples of these haloalkyl-phosphates are 2,2-bis(chloromethyl)tri methylene bis(bis(2-chloroethyl) phosphate) and/or tris (2-chloroisopropyl) phosphate.

Other flame-retardant additives, which can be present as component k) are halogenated paraffins, such as chlorinated $C_{18}$-$C_{26}$ paraffin, which is marketed by Everkem under the trademark Cloparin S70. The halogenated paraffins improve the flame retardancy during the early stage of a fire and also improve char texture.

Further components included in the cross-linkable flame-retardant coating composition of the invention can be cellulose esters as component I) which can be further modified, e.g. with aceto butyrate or aceto propionate. Particularly useful are $C_1$ to $C_6$ cellulose esters, such as cellulose acetate, cellulose butyrate or mixtures such as cellulose acetate-butyrate (CAB). These esters can be used in order to improve the surface hardness of the paint and improve the char formation.

The weight ratio of the dendritic polymer having hydroxyl groups (component a) in relation to the basecoat polymer (component d) is preferably a:d=1:2 to 1:5, more preferably 1:3 to 1:5, most preferably 1:3 to 1:4.

The weight ratio of the ammonium polyphosphate compound (component c) in relation to the dendritic polymer having hydroxyl groups (component a) is preferably c:a=2:1 to 6:1, more preferably 3:1 to 5:1, most preferably 4:1 to 5 to 1.

The weight ratio of the polyol having at least 3 hydroxyl groups (component b) in relation to the basecoat polymer (component d) is preferably b:d=1:1.5 to 1:4, more preferably 1:1.5 to 1:3, most preferably 1:2 to 1:3.

The weight ratio of the ammonium polyphosphate compound (component c) in relation to the basecoat polymer (component d) is preferably c:d=0.5:1 to 3:1, more preferably 0.5:1 to 2:1, most preferably 1:1 to 2:1.

The weight ratio of the acid catalyst (component f) in relation to the basecoat polymer (component d) is preferably f:d=1:15 to 1:35, more preferably 1:18 to 1:30, most preferably 1:19 to 1:25.

The weight ratio of the solvent (component g) in relation to the basecoat polymer (component d) is preferably g:d=1:2 to 4:1, preferably 1:1 to 3:1 more preferably 1:1 to 2:1.

The weight ratio of the fluorinated polymer (component h) in relation to the basecoat polymer (component d) is preferably h:d=1:40 to 1:200, more preferably 1:50 to 1 to 150, most preferably 1:60 to 1:130.

The weight ratio of polyol (component b) in relation to the ammonium polyphosphate compound (component c) is preferably b:c=1:1.5 to 1:4.5, more preferably 1:2 to 1:4, most preferably 1:2.5 to 1:3.5.

The weight ratio of the halogenated paraffins (component k) in relation to the basecoat polymer (component d) is preferably k:d=1:5 to 1:11, more preferably 1:6 to 1 to 10, most preferably 1:7 to 1:9.

The weight ratio of the cellulose esters (component I) in relation to the basecoat polymer (component d) is preferably l:d=1:8 to 1:14, more preferably 1:9 to 1 to 13, most preferably 1:10 to 1:13.

The above weight ratios are calculated from the weight % of each ingredient as presented in Tables 1 and 2 below, based on a ratio of 100 parts of basecoat formulation (Table 1) to 30 parts of basecoat hardener formulation (Table 2) being used for crosslinking the flame-retardant compositions.

The cross-linkable flame-retardant coating composition can furthermore be a two-component coating composition comprising a basecoat formulation 1) and a basecoat hardener formulation 2), wherein the basecoat formulation comprises at least component d) and the basecoat hardener formulation comprises at least component e) and—if present—component f). Such a two-component coating composition ensures that the basecoat polymer, component d) and the respective cross-linker, component e) and—if present—the acid catalyst, component f) are stored separate from each other, so that the cross-linkable flame-retardant coating composition can be stored for a long period of time without cross-linking. The other components of the cross-linkable flame-retardant coating composition of the invention can be included in either the basecoat formulation or the basecoat hardener formulation. If the basecoat hardener formulation 2) comprises an acid catalyst, it is preferred that the ammonium polyphosphate compound as component c) is kept separate from the acid catalyst in order to ensure the stability of the ammonium polyphosphate compound. In this case component c) should be included in the basecoat formulation.

Preferably all the major components of a two-component cross-linkable flame-retardant coating composition, in particular components a), b), c), d), and—if present g), h), i) and/or j) are included in the basecoat formulation. The other components, the cross-linker, component e),—if present— the acid catalyst, component f) and solvents, component g) would be part of the basecoat hardener formulation.

The invention is also directed to a flame-retardant cured (cross-linked) coating comprising any of the embodiments of the cross-linked composition described above.

The cross-linkable flame-retardant coating composition can be applied to a substrate. Cross-linking is initiated by mixing the basecoat formulation and the basecoat hardener formulation. Subsequently, the mixture is applied to a substrate by for example using a spraygun, a roller coater, curtain coater or a brush while still being liquid. Alternatively, the substrate might also be dipped into a mixture of the basecoat formulation and the basecoat hardener formulation. The cross-linking can take place within minutes and might take a few hours, in particular at room temperature, depending on the ratio of the basecoat polymer in relation to the cross-linker. In particular the weight ratio of basecoat polymer (component d) to cross-linker (component e) can be in the range of d:e=1.5:1 to 6:1, more preferably 2:1 to 5:1, most preferably 3:1 to 4:1.

In general, every substrate which does not melt and which shows sufficient adhesion in the event of a fire can be coated with the cross-linkable flame-retardant coating composition of the invention. In particular, the substrate can be selected from a group consisting of wood, metal, glass, stone and polymers. Preferably, the substrate comprises a material including cellulose, for example wood. Wood is a particular preferred substrate, because the acid released from the ammonium polyphosphate in the event of a fire can dehydrate the wood and can provide carbonaceous material for the carbonaceous char during the intumescent effect in addition to component b).

Another aspect of the present invention is therefore directed to a substrate with a flame-retardant coating, wherein the coating comprises the cross-linked composition of the present invention as described herein.

The coating can either be a pigmented, colored coating or preferably, as mentioned above, a clear coat, which allows the texture of the underlying substrate to be viewed. Particularly advantageous is a cellulosic material, preferably wood, whose texture is still visible after being covered by the clear coat of the present invention. The present invention is thus particularly suited to be used as a clear coat for furniture.

In general, the cured coating resulting from the cross-linking of the cross-linkable flame-retardant compositions disclosed herein, is highly scratch resistant and is also resistant to chemicals, when protected by a top coat. In particular, the cured coating can fulfill the requirements of the standard EU norms EN 12720 (chemical resistance), EN 15186 (scratch resistance), EN 12721 (wet heat resistance), EN 12722 (dry heat resistance) and EN15187 (light fastness). The crosslinkable flame-retardant coating composition also fulfills the requirements of the norm CEN TS 16209 class B for cold liquids, class C for scratch resistance, C for wet heat, and D for dry heat, when protected by a top coat. In particular, the cross-linkable flame-retardant composition can be used for furniture, in particular wooden furniture. Passive fire protection is required in the interior of public buildings, such as administration buildings, theaters, cinemas or hotels.

The substrate can furthermore comprise a top coating arranged on the base coating of the present invention. Preferably, the top coating comprises a silane resin. Preferably the silane resin can be cured at room temperature and comprises alkoxy-siloxanes which can be cured at room temperature. These top coatings can provide a further modification of the appearance of the coated substrate, for example coloring and/or glossiness.

Furthermore, the top coating can improve the chemical and physical characteristics of the base coating without impairing the flame-retardancy conferred by the base coating. If the base coating is a clear coat, then the top coating can also be clear.

A further aspect of the invention is directed to the use of the cross-linkable flame-retardant compositions of the invention as described herein for coating a substrate comprising cellulosic material, preferably wood.

Another aspect of the present invention is directed to a process for producing a flame-retardant coating on a substrate comprising the method steps of:
  A) applying a cross-linkable flame-retardant composition as described herein on a substrate,
  B) curing the composition to provide the coating on the substrate.

Method step A) can be performed by mixing the basecoat polymer, component d) with the cross-linker, component e), and the other components a), b), c) and—if present— components g), h), i) or j). In the case of a two-component coating composition, the basecoat hardener formulation and the base coat formulation are mixed and subsequently the mixed composition is applied on a substrate, by using any means available for spreading a coating on a substrate.

Method step B) can normally be performed by letting the composition cure at room temperature for a time period of several minutes and up to several hours.

In the following, the invention will be explained in more detail with regard to experimental data concerning certain embodiments.

Flame-retardancy and overall appearance of the clear coatings of different flame-retardant coating compositions:

In the following Table 1, the compositions of three different formulations for clear basecoat formulations termed "Formulation No. 1A" to "Formulation No. 3A" are described, each formulation including ingredients 1 to 12.

TABLE 1

(wt % of each ingredient):

| Ingredient | Component | Formulation No. 1A | Formulation No. 2A | Formulation No. 3A |
|---|---|---|---|---|
| 1 | Dendritic polymer | 7 | 7 | 7 |
| 2 | Ethylic alcohol | 5 | 5 | 5 |
| 3 | Dipentaerythritol | 9.4 | 9.4 | 9.4 |
| 4 | Carbamate resin | 25.3 | 25.3 | 25.2 |
| 5 | Methyl ethyl ketone | 3 | 3 | 3 |
| 6 | Ethylic alcohol | 9.8 | 9.9 | 9.8 |
| 7 | Modified CAB | 2 | 2 | 2 |
| 8 | Ammonium polyphosphate | 29.8 | 30 | 29.8 |
| 9 | Chlorinated paraffin | 3 | 3 | 3 |
| 10 | Tris (2-chloroisopropyl) phosphate | 5 | 5 | 5 |

TABLE 1-continued

| | | (wt % of each ingredient): | | |
|---|---|---|---|---|
| Ingredient | Component | Formulation No. 1A | Formulation No. 2A | Formulation No. 3A |
| 11 | Modified sepiolite | 0.5 | 0.4 | 0.4 |
| 12 | Polymeric fluorinated additive | 0.2 | 0 | 0.4 |

In particular, the following ingredients were used for the clear base coat formulations:
Dendritic polymer: Boltorn P1000 (Perstorp)
Carbamate resin: Paraloid Edge 1311 HP (Dow)
Modified CAB: Solus 3050 performance additive (Eastman)
Chlorinated paraffin: Cloparin S70 (Everkem) (C18-C25 chlorinated paraffin)
Modified sepiolite: Fireproof 20 (Adins)
Polymeric fluorinated additive: Hexafor 685 (Maflon)
Ammonium polyphosphate: Phos check P/42 (ICL) (ammonium polyphosphate form II, n>=1000); chemical formula:

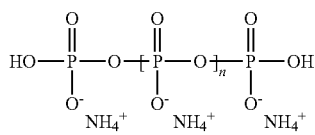

Tris (2-chloroisopropyl) phosphate: Fyrol PCF (ICL)
The clear base coat formulations can be manufactured by mixing ingredients 1, 2, 3, 4, 5, 6, and 7 using a high speed stirrer in a first container (2000 rpm). Subsequently, the ingredients 8, 9 and 10 are added and then mixed with a high speed stirrer for 20 minutes (2000 rpm). Afterwards, the mixture is milled with a beat mill (dispermat) at 6000 rpm for 30 minutes and then the ingredients 11 and 12 are added under stirring. The final mixture is mixed for 20 minutes.

In the following Table 2, the composition of the clear basecoat hardener formulation is shown, the formulation including the ingredients 1 to 7:

TABLE 2

| | (wt % of each ingredient): | |
|---|---|---|
| Ingredient | Component | Formulation No. 1B |
| 1 | isobutylic alcohol | 6 |
| 2 | Ethylic alcohol | 56 |
| 3 | Diacetone alcohol | 5 |
| 4 | Methyl ethyl ketone | 5 |
| 5 | paratoluene sulfonic acid | 4 |
| 6 | Antioxidant | 1 |
| 7 | CHDA (compound having 2 or more aldehyde groups) | 23 |

In particular, the following ingredients were used for the clear base coat hardener formulation:
Antioxidant: Irganox 1010 (BASF) (Pentaerythritol tetrakis(3-(3,5-di-tert-butyl-4-hydroxyphenyl)propionate)
CHDA: Paraloid edge XL 195 (DOVV) (mixture of cis-1,3-cyclohexanedicarboxaldehyd and trans-1,4-cyclohexanedicarboxaldehyd)
Ingredients 1 to 4 are combined and then mixed via stirring. While stirring, the ingredients 5, 6 and 7 are added and then stirring is continued until complete dissolution in order to produce the base coat hardener formulation. Oxygen intake has to be avoided in order to minimize aldehyde oxidation by employing either a low speed of the stirrer (300-600 rpm) or by working under a nitrogen atmosphere.

The clear basecoat formulations No. 1A, No. 2A, and No. 3A are hardened by mixing 100 parts of the respective basecoat formulation with 30 parts of clear basecoat hardener formulation No. 1B (77% basecoat+23% basecoat hardener (w/w)) to provide the cross-linked coatings No. 1, No. 2 and No. 3, as shown in table 3.

TABLE 3

| Cross-linked coating | basecoat formulation | Basecoat hardener formulation |
|---|---|---|
| No. 1 | No. 1A | No. 1B |
| No. 2 | No. 2A | No. 1B |
| No. 3 | No. 3A | No. 1B |

In the following Table 4, the composition of two different top coating formulations including the ingredients 1 to 6 is shown.

TABLE 4

| | (wt % of each ingredient): | | |
|---|---|---|---|
| Ingredient | Component | Formulation No. 4A | Formulation No. 5A |
| 1 | Butyl acetate | 23.45 | 23.45 |
| 2 | Polyamidic wax | 0.5 | 0.5 |
| 3 | Ethyl acetate | 36 | 36.5 |
| 4 | Silane resin | 35 | 25.3 |
| 5 | Matting agent | 4.5 | 4 |
| 6 | Siliconic additive | 0.05 | 0.05 |
| | Final gloss | 2 | 6 |

In particular, the following ingredients were used for the top coating formulations:
Poliamidic wax: Disparlon PFA 230 (Kusumoto)
Silane resin: Dowsil 2405 resin (DOVV)
Matting agent: Acematt OK 520 (Evonik) (wax-treated, precipitated silica with particle size $d_{50}$ of 6.5 μm)
Siliconic additive: borchi gol OL 17 (Borchers)
The top coating formulation is prepared by mixing the ingredients 1 to 4 followed by adding the ingredient 5 while stirring. The mixture is stirred with a high speed stirrer for 20 minutes (2000 rpm). Finally, ingredient 6 is added under stirring and mixed mildly for 5 minutes (about 300-600 rpm). The final gloss was measured with a BYK Gardner micro gloss instrument, 60° geometry.

The following Table 5 shows the composition of the top coating hardener composition including two different ingredients 1 and 2.

TABLE 5

| | (wt % of each ingredient): | |
|---|---|---|
| Ingredient | Component | Formulation No. 4B |
| 1 | Butyl acetate | 60 |
| 2 | TNBT | 40 |

TNBT: Tyzor TNBT (tetra-N-butyl titanate)

The clear basecoat formulations No. 1A, No. 2A, and No. 3A are hardened by mixing 100 parts of the respective basecoat formulation with 30 parts of clear basecoat hardener formulation No. 1B (77% basecoat+23% basecoat hardener (w/w)) to provide the cross-linked coatings No. 1, No. 2 and No. 3, as shown above in table 3.

The respective mixtures of the basecoat formulation and the basecoat hardener formulation are applied by a gravity spray gun. Two layers of coating of around 200 to 250 g/m$^2$ are applied in a time interval of 3 to 16 hour without sanding. After 16 hours of drying, light sanding is applied by sanding manually using 320 grit sanding paper. 24 hours after the second basecoat application, the basecoat is sanded (320 grit) and then 100 parts top coating formulation (formulation 4A) with 10 parts of top coating hardener formulation (91% top coating+9% top coating hardener, (w/w)) is applied using a gravity spray gun with a concentration of 60 to 80 g/m$^2$.

All three clear coating compositions provided good flame-retardancy in accordance with EN 13501, with clear coating No. 1 showing the best flame-retardancy.

In order to evaluate the influence of the amount of the dendritic polymer having hydroxyl groups on the performance of the coating, the following clear base coating formulations No. 6A to No. 9A were prepared. The same ingredients were used as for the formulations listed in Table 1.

clarity differences. Cross-linked coating No. 6 serves as a comparative coating, since the clear coat formulation No. 6A does not contain any dendritic polymer having hydroxyl groups.

The stained wood panel coated with the comparative coating No. 6 shows whitish halos near the borders and in addition whitish pores. The inventive coating No. 7 only shows a few of these defects and the inventive coating No. 8 does not show any defects. Coating No. 9 shows improved clarity but also includes some fish eyes. These data suggest that the dendritic polymer serves as a wetting agent for the polyol having at least 3 hydroxyl groups. For the coated Plexiglas panels no big differences can be observed for the appearance of the four different coatings No. 6, No. 7, No. 8 and No. 9.

The flame-retardancy was tested for the wood panels (low density fiberboards) coated with the comparative coating No. 6, and the inventive coating No. 8 in accordance with the Italian norm UN19174 which was used to provide an indication if the coatings can comply with EN 13501. The duration of the flame test was 5 minutes. The following Table 8 shows the time period (in seconds) a flame requires to spread over an area of either 50, 100, 150 or 200 mm (horizontal spread of the flame on the panel). If the panels did not support the spread of a flame over a certain area, then no time span was indicated in the below Table 8.

TABLE 6

(wt % of each ingredient):

| Ingredient | Component | Formulation No. 6A (comparative) | Formulation No. 7A | preferred formulation Formulation No. 8A | Formulation No. 9A |
|---|---|---|---|---|---|
| 1 | Dendritic polymer (Boltorn P1000) | 0 | 3 | 7 | 10 |
| 2 | Ethylic alcohol | 5 | 5 | 5 | 5 |
| 3 | Dipentaerithrol | 9.4 | 9.4 | 9.4 | 9.4 |
| 4 | Carbamate resin | 35.3 | 31.3 | 25.3 | 20.3 |
| 5 | Methyl ethyl ketone | 3 | 3 | 3 | 3 |
| 6 | Ethylic alcohol | 6.8 | 7.8 | 9.8 | 11.8 |
| 7 | Modified CAB (Cellulose Acetate Butyrate) | 2 | 2 | 2 | 2 |
| 8 | Ammonium polyphosphate | 29.8 | 29.8 | 29.8 | 29.8 |
| 9 | Chlorinated paraffin | 3 | 3 | 3 | 3 |
| 10 | TCP | 5 | 5 | 5 | 5 |
| 11 | Modified sepiolite | 0.5 | 0.5 | 0.5 | 0.5 |
| 12 | Polymeric fluorinated additive | 0.2 | 0.2 | 0.2 | 0.2 |

The base coating formulations No. 6A to No. 9A were hardened with the basecoat hardening formulation No. 1B as described above in Table 2 and subsequently thinned with 10% butyl acetate to provide the cross-linked coatings No. 6, No. 7, No. 8 and No. 9, as shown in Table 7.

TABLE 7

| Cross-linked coating | basecoat formulation | Basecoat hardener formulation |
|---|---|---|
| No. 6 (comparative) | No. 6A | No. 1B |
| No. 7 | No. 7A | No. 1B |
| No. 8 | No. 8A | No. 1B |
| No. 9 | No. 9A | No. 1B |

Afterwards two separate base coatings (16 hours between the application of the two separate base coatings) were applied with a concentration of 230 g/m$^2$ on dark stained wood panels and on black Plexiglas panels to enhance

TABLE 8

| | Time to reach the given flamespread goal | |
|---|---|---|
| Flamespread | coating No. 6 (comparative) | coating No. 8 |
| 50 mm | 17" | 13" |
| 100 mm | 27" | 20" |
| 150 mm | 74" | — |
| 200 mm | | |

Table 8 shows that coating No. 8 containing 7 wt % dendritic polymer having hydroxyl groups in the base coating formulation (see Table 6) did not support the spread of the flame over an area of 150 mm, in contrast to the comparative coating No. 6 lacking the dendritic polymer. For the comparative coating No. 6, the flame spread over an area of 150 mm was reached after 74 seconds.

These data show that the dendritic polymer improves the flame-retardancy of the panels, in particular if present in an amount of 4 wt % to 9 wt %, preferably 5 wt % to 8 wt % of the base coating formulation.

Effect of the Hydroxyl Number of the Dendritic Polymer Having Hydroxyl Groups

In order to evaluate the effect of the hydroxyl number of the dendritic polymer having hydroxyl groups, above base coat formulation No. 8A of Table 6 was modified by replacing the Boltorn P1000 (hydroxyl number=470) with either Boltorn P500 (hydroxyl number=600) or Boltorn H2400 (hydroxyl number=120). Coatings including the modified basecoat formulation were produced as described above.

When assessing the overall appearance of coated panels, the panel coated with the clear coating composition comprising Boltorn P1000 seems to be slightly clearer than the other panels.

When assessing the appearance of the stained wood panels coated with clear coatings including either Boltorn P500, Boltorn P1000 or Boltorn H2400, again the panel coated with the clear coating composition comprising Boltorn P1000 seems to be slightly more clear than the other panels.

Flame-Retardancy of Flame-Retardant Coating Compositions Comprising Different Dendritic Polymers Having Hydroxyl Groups The three stained wood panels coated with the different coatings including the different dendritic polymers having hydroxyl groups Boltorn P500, Boltorn P1000 or Boltorn H2400 were subjected to a 5 minute flame-retardancy test according to the Italian norm UN19174. The results are shown in the below Table 9:

TABLE 9

| Flamespread | Time to reach the given flamespread goal | | |
|---|---|---|---|
| | P1000 | P500 | H2400 |
| 50 mm | 36" | 40" | 31" |
| 100 mm | 116" | 52" | 41" |
| 150 mm | 169" | 159" | 145" |
| 200 mm | | 196" | 185" |

These data show that the flame-retardant coating composition comprising Boltorn P1000 did not maintain spread of the flame over an area of 200 mm in contrast to the two other flame-retardant coating compositions comprising Boltorn P500 and Boltorn H2400. The flame-retardant coating composition comprising Boltorn P 500 performed slightly better than the flame-retardant coating composition comprising Boltorn H 2400, because the spread of the flame over an area of 200 mm took longer for the flame-retardant coating composition including Boltorn P500.

These data suggest that the hydroxyl number of the dendritic polymer having hydroxyl groups should preferably be in the range of 460 to 480, more preferably 500.

It is to be understood that the above-described embodiments are only examples. Many modifications and variations are possible without departing from the scope of the claims.

What is claimed is:

1. A crosslinkable flame-retardant coating composition comprising the following components:
   a) a dendritic polymer having hydroxyl groups, wherein the dendritic polymer has a hydroxyl number in the range of 80 to 800,
   b) a polyol having at least 3 hydroxyl groups, wherein a) and b) are different from one another,
   c) an ammonium polyphosphate compound,
   d) a base coat polymer selected from a polycarbamate resin or a polymer bearing carboxyl groups, and
   e) a crosslinker for crosslinking the base coat polymer selected from a compound having two or more aldehyde groups, acetals or hemiacetals of the aldehydes, or a polycarbodiimide,
   wherein the crosslinkable flame-retardant coating composition is isocyanate-free.

2. The crosslinkable flame-retardant composition of claim 1 for forming an isocyanate-free polyurethane coating, wherein component d) comprises a polycarbamate resin as the base coat polymer and component e) comprises a compound having two or more aldehyde groups, acetals or hemiacetals of the aldehydes, as the crosslinker, the composition further comprising a component f) an acid catalyst.

3. The crosslinkable flame-retardant composition of claim 1 for forming a poly-N-acylurea coating, wherein component d) comprises a polymer having two or more carboxylic acid groups as the base coat polymer and component e) comprises a polycarbodiimide as the crosslinker.

4. The crosslinkable flame-retardant coating composition of claim 1, which is a clear coating composition.

5. The crosslinkable flame-retardant coating composition of claim 1, which contains pigments and/or colorants.

6. The crosslinkable flame-retardant coating composition of claim 1, wherein component a) has a hydroxyl value of between 100 to 700.

7. The crosslinkable flame-retardant coating composition of claim 1, wherein the component b) has at least 5 hydroxyl groups, and is selected from the group consisting of pentaerythritol, dipentaerythritol, and tripentaerythritol.

8. The crosslinkable flame-retardant coating composition of claim 1, wherein component e) is selected from the group consisting of 1,3-cyclohexanedicarboxaldehyde and 1,4-cyclohexanedicarboxaldehyde or mixtures thereof.

9. The crosslinkable flame-retardant coating composition of claim 1, further comprising at least one solvent as component g), selected from alcohols, acetates and/or ketones.

10. The crosslinkable flame-retardant coating composition of claim 1, further comprising a fluorinated polymer as component h), and/or wherein the composition does not comprise a melamine.

11. The crosslinkable flame-retardant coating composition of claim 1, wherein the weight ratio of at least one of the components a) to c) is selected from the following weight ratios:
   the weight ratio of the dendritic polymer having hydroxyl groups (component a) in relation to the base coat polymer (component d) is a:d=1:2 to 1:5, and/or
   the weight ratio of the polyol having at least 3 hydroxyl groups (component b) in relation to the base coat polymer (component d) is b:d=1:1.5 to 1:4, and/or
   the weight ratio of the ammonium polyphosphate compound (component c) in relation to the base coat polymer (component d) is c:d=0.5:1 to 3:1.

12. The crosslinkable flame-retardant coating composition of claim 1, wherein the weight ratio of the base coat polymer (component d) in relation to the crosslinker (component e) in relation to is d:e=1.5:1 to 6:1.

13. The crosslinkable flame-retardant coating composition of claim 1, which is a two-component coating composition comprising 1) a base coat formulation, and 2) a base coat hardener formulation, wherein the base coat formulation comprises at least component d) and the base coat hardener formulation comprises at least component e).

14. The crosslinkable flame-retardant coating composition of claim 1, wherein the dendritic polymer comprises a polyester, polyether, polythioether, polyamide, polyether amide, polyacrylate, polyalkylene, or a combination thereof.

15. A flame-retardant base coating comprising the crosslinked composition of claim 1.

16. A substrate with a flame-retardant base coating, the base coating comprising the crosslinked composition of claim 1.

17. The substrate of claim 16, wherein the substrate comprises a cellulosic material.

18. The substrate of claim 16, wherein the substrate comprises wood.

19. The substrate of claim 16, further comprising a top coating arranged on the base coating, wherein the top coat comprises a silane resin.

20. A process for producing a flame-retardant base coating on a substrate comprising the method steps of:
  A) applying a crosslinkable flame-retardant composition of claim 1 on a substrate,
  B) curing the composition to provide the base coating on the substrate.

* * * * *